(12) United States Patent
D'Silva et al.

(10) Patent No.: US 9,548,595 B2
(45) Date of Patent: Jan. 17, 2017

(54) SYSTEM FOR EXTENDING AN ELECTRICAL CABLE THROUGH A TUBULAR MEMBER

(71) Applicants: Alben D'Silva, Edmonton (CA); John Keith Savage, Edmonton (CA); Kennedy John Kirkhope, Leduc (CA)

(72) Inventors: Alben D'Silva, Edmonton (CA); John Keith Savage, Edmonton (CA); Kennedy John Kirkhope, Leduc (CA)

(73) Assignee: Halliburton Energy Services, Inc., Houston, TX (US)

( * ) Notice: Subject to any disclaimer, the term of this patent is extended or adjusted under 35 U.S.C. 154(b) by 4 days.

(21) Appl. No.: 14/562,162

(22) Filed: Dec. 5, 2014

(65) Prior Publication Data
US 2015/0162730 A1    Jun. 11, 2015

Related U.S. Application Data

(60) Provisional application No. 61/913,096, filed on Dec. 6, 2013.

(51) Int. Cl.
*H02G 3/04* (2006.01)
*F16L 3/01* (2006.01)
(Continued)

(52) U.S. Cl.
CPC ............ *H02G 3/0462* (2013.01); *E21B 41/00* (2013.01); *F16L 3/01* (2013.01); *F16L 3/26* (2013.01);
(Continued)

(58) Field of Classification Search
USPC .................. 174/68.3, 64, 59, 21 R
See application file for complete search history.

(56) References Cited

U.S. PATENT DOCUMENTS 3,833,754 A * 9/1974 Philibert .................. H01R 4/64
174/653
4,095,865 A    6/1978 Denison et al.
(Continued)

OTHER PUBLICATIONS

International Search Report dated Feb. 24, 2015 provided by the Canadian Intellectual Property Office as the International Searching Authority (ISA) in PCT International Application No. PCT/CA2014/000869 (3 pages).

*Primary Examiner* — Dhirubhai R Patel
(74) *Attorney, Agent, or Firm* — Terrence N. Kuharchuk; Parlee McLaws LLP; Clive D. Menezes (57) ABSTRACT

A system for extending an electrical cable through a tubular member, including the electrical cable, a first cable hanger component for connecting with a first tubular member end, and a second cable hanger component for connecting with a second tubular member end. A method for extending an electrical cable through a tubular member, including mechanically and electrically connecting the electrical cable with the second cable hanger component, extending the electrical cable through the tubular member, connecting the second cable hanger component with the second tubular member end, extending the electrical cable through the first cable hanger component, connecting the first cable hanger component with the first tubular member end, mechanically and electrically connecting the electrical cable with the first cable hanger component, and tensioning the electrical cable.

21 Claims, 4 Drawing Sheets

(51) Int. Cl.
    *F16L 3/26* (2006.01)
    *H02G 1/00* (2006.01)
    *H02G 15/007* (2006.01)
    *H02G 15/04* (2006.01)
    *E21B 41/00* (2006.01)
    *H02G 1/10* (2006.01)

(52) U.S. Cl.
    CPC .................. *H02G 1/00* (2013.01); *H02G 1/10* (2013.01); *H02G 15/007* (2013.01); *H02G 15/046* (2013.01)

(56) References Cited

U.S. PATENT DOCUMENTS

| | | |
|---|---|---|
| 4,909,741 A | 3/1990 | Schasteen et al. |
| 5,389,003 A | 2/1995 | Van Steenwyk et al. |
| 5,468,153 A | 11/1995 | Brown et al. |
| 5,725,061 A | 3/1998 | Van Steenwyk et al. |
| 7,040,415 B2 | 5/2006 | Boyle et al. |
| 7,084,782 B2 | 8/2006 | Davies et al. |
| 7,168,510 B2 | 1/2007 | Boyle et al. |
| 8,162,044 B2 | 4/2012 | Sihler |
| 8,431,836 B2 * | 4/2013 | Miretti ................ H02G 3/0675 16/2.2 |
| 8,462,013 B2 | 6/2013 | Hawthorn et al. |
| 9,178,303 B2 * | 11/2015 | Franke ................ H02G 15/007 |
| 2004/0244964 A1 | 12/2004 | Hall et al. |
| 2005/0001736 A1 | 1/2005 | Hall et al. |
| 2010/0052941 A1 | 3/2010 | Madhavan et al. |
| 2010/0282511 A1 | 11/2010 | Maranuk et al. |
| 2011/0073303 A1 | 3/2011 | Taherian et al. |

* cited by examiner

SYSTEM FOR EXTENDING AN ELECTRICAL CABLE THROUGH A TUBULAR MEMBER

TECHNICAL FIELD

A system and a method for extending an electrical cable through a tubular member.

BACKGROUND OF THE INVENTION

A pipe string may be comprised of one or more tubular members. It may be desirable in some circumstances to transfer electrical energy through a pipe string in order to deliver electrical power and/or electrical communications through the pipe string.

It may be particularly desirable in some circumstances to deliver electrical power and/or electrical communications to a tubular member or through a tubular member which is interposed within the pipe string.

BRIEF DESCRIPTION OF DRAWINGS

Embodiments of the invention will now be described with reference to the accompanying drawings, in which.

DETAILED DESCRIPTION

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present disclosure is directed at a system and a method for extending an electrical cable through a tubular member. In some embodiments, the system and method described herein may enable a tubular member which otherwise does not facilitate the transfer of electrical energy therethrough to become "wired" without modification of the tubular member.

The tubular member may be isolated, may be connected with one or more other tubular members, and/or may be positioned within a pipe string which includes the tubular member. The tubular member may be interposed within a pipe string and/or between other tubular members, or may be connected at an end of a pipe string and/or at the end of another tubular member.

A pipe string including the tubular member may be comprised of lengths or joints of pipe connected together such as drill pipe, well casing, well tubing as non-limiting examples, or may be comprised of a continuous pipe string such as coiled tubing as a non-limiting example.

The system and method described in the present disclosure may be used to deliver electrical energy such as electrical power and/or communications to the tubular member and/or through the tubular member.

The tubular member may be comprised of any tubular structure which includes a bore extending therethrough, wherein the bore is capable of accommodating the electrical cable.

In some embodiments, the tubular member may be a tool or device, may be comprised of a tool or device, or may contain a tool or device which itself requires electrical power and/or communications. In some particular embodiments, as non-limiting examples, the tool or device may be a reamer or a drilling motor. In some embodiments, the tubular member may be a conduit which facilitates the transfer of electrical energy therethrough to tools or devices which are not included within or otherwise associated with the tubular member.

The tubular member may have a first tubular member end and a second tubular member end.

In some embodiments, the system for extending an electrical cable through a tubular member may comprise the electrical cable, a first cable hanger component for connecting with the first tubular member end, and a second cable hanger component for connecting with the second tubular member end.

The first cable hanger component and the second cable hanger component are connectable with the first tubular member end and the second tubular member end respectively. The cable hanger components may be connectable with the tubular member ends in any suitable manner. In some embodiments, the one or both of the cable hanger components may be permanently connected with the tubular member ends by welding or in some other manner. In some embodiments, one or both of the cable hanger components may be formed integrally with the tubular member. In some embodiments, one or both of the cable hanger components may be releasably connectable with the tubular member ends with threaded connections or in some other manner.

In some embodiments, the first cable hanger component may be comprised of a first mechanical connector for mechanically connecting the electrical cable with the first cable hanger component. In some embodiments, the second cable hanger component may be comprised of a second mechanical connector for mechanically connecting the electrical cable with the second cable hanger component.

In some embodiments, the system may be comprised of a tensioning mechanism for tensioning the electrical cable. In some embodiments, the tensioning mechanism may be included within or otherwise associated with the first cable hanger component and/or the second cable hanger component. In some embodiments, separate tensioning mechanisms may be included within or otherwise associated with each of the first cable hanger component and the second cable hanger component, thereby increasing the versatility of the system.

In some embodiments, the tensioning mechanism may be comprised of an adjusting mechanism for adjusting a distance between the first mechanical connector and the second mechanical connector. In some embodiments, the adjusting mechanism may be included within or otherwise associated with the first cable hanger component and/or the second cable hanger component. In some embodiments, the adjusting mechanism may adjust an axial position of the first mechanical connector within the first cable hanger component and/or adjust an axial position of the second mechanical connector within the second cable hanger component.

In some particular embodiments, the first cable hanger component may be comprised of a tensioning mechanism. In some particular embodiments, the second cable hanger component may be comprised of a tensioning mechanism. In some particular embodiments, both the first cable hanger component and the second cable hanger component may be comprised of a tensioning mechanism.

The tensioning mechanism and/or the adjusting mechanism may be comprised of any suitable structure, device and/or apparatus.

In some embodiments, the system may extend the electrical cable through the tubular member such that an exterior jacket on the electrical cable does not electrically contact the tubular member. In such embodiments, if the exterior jacket of the electrical cable is constructed of an electrically conductive material, the exterior jacket of the electrical cable may provide a separate electrical path through the tubular member without being grounded to the tubular member. In some such embodiments, the tensioning mechanism may assist in enabling the electrical cable to extend through the tubular member without electrically contacting the tubular member, by eliminating or reducing slack in the electrical cable as it extends through the tubular member.

In some embodiments, the first cable hanger component may be comprised of a first electrical connector for electrically connecting the electrical cable with the first cable hanger component. In some embodiments, in addition to providing a connection with the electrical cable, the first electrical connector may provide a connection between another electrical component and the first cable hanger component.

In some embodiments, the second cable hanger component may be comprised of a second electrical connector for electrically connecting the electrical cable with the second cable hanger component. In some embodiments, in addition to providing a connection with the electrical cable, the second electrical connector may provide a connection between another electrical component and the second cable hanger component.

As a result, in some embodiments, the first electrical connector, the electrical cable and the second electrical connector may provide an electrical path between the first cable hanger component and the second cable hanger component so that electrical energy can be transferred between the first cable hanger component and the second cable hanger component, and the electrical connectors may also enable the electrical path to be connected with one or more other electrical components including, as non-limiting examples, other electrical cables, electrical generators, electrical batteries, electrical loads etc.

In some embodiments, the first cable hanger component may be comprised of a first cable hanger sub. In some embodiments, the second cable hanger component may be comprised of a second cable hanger sub.

In some embodiments, the first cable hanger component may be comprised of a first cover sub for covering the first mechanical connector, the first electrical connector, and/or the tensioning mechanism. In some embodiments, the first cover sub may be releasably connectable with the first cable hanger sub.

In some embodiments, the second cable hanger component may be comprised of a second cover sub for covering the second mechanical connector, the second electrical connector, and/or the tensioning mechanism. In some embodiments, the second cover sub may be releasably connectable with the second cable hanger sub.

The first cable hanger component and the second cable hanger component may each be separately configured to provide either a stationary connection with the electrical cable or a rotary connection with the electrical cable. A stationary connection does not enable rotation of the electrical cable relative to the hanger component. A rotary connection does enable rotation of the electrical cable relative to the hanger component.

In some embodiments, the first cable hanger component may provide a stationary connection between the electrical cable and the first cable hanger component. In some embodiments, the first cable hanger component may provide a rotary connection between the electrical cable and the first cable hanger component.

In some embodiments, the second cable hanger component may provide a stationary connection between the electrical cable and the second cable hanger component. In some embodiments, the first cable hanger component may provide a rotary connection between the electrical cable and the second cable hanger component.

In some embodiments, the first cable hanger component may provide a stationary connection between the electrical cable and the first cable hanger component and the second cable hanger component may provide a stationary connection between the electrical cable and the second cable hanger component.

In some embodiments, the first cable hanger component may provide a rotary connection between the electrical cable and the first cable hanger component and the second cable hanger component may provide a stationary connection between the electrical cable and the second cable hanger component.

In some embodiments, the first cable hanger component may provide a stationary connection between the electrical cable and the first cable hanger component and the second cable hanger component may provide a rotary connection between the electrical cable and the second cable hanger component.

In some embodiments, the first cable hanger component may provide a rotary connection between the electrical cable and the first cable hanger component and the second cable hanger component may provide a rotary connection between the electrical cable and the second cable hanger component.

In some embodiments, the method for extending an electrical cable through a tubular member may be comprised of providing the electrical cable, providing a first cable hanger component comprising a first mechanical connector, and providing a second cable hanger component comprising a second mechanical connector.

In some embodiments, the method may be further comprised of mechanically connecting the electrical cable with the second cable hanger component using the second mechanical connector, electrically connecting the electrical cable with the second cable hanger component, extending the electrical cable through the tubular member so that the electrical cable protrudes from the first tubular member end, connecting the second cable hanger component with the second tubular member end, extending the electrical cable through the first cable hanger component, connecting the first cable hanger component with the first tubular member end, mechanically connecting the electrical cable with the first cable hanger component using the first mechanical connector, and electrically connecting the electrical cable with the first cable hanger component.

In some embodiments, the method may be further comprised of tensioning the electrical cable between the first mechanical connector and the second mechanical connector.

In some embodiments, tensioning the electrical cable may be performed after mechanically connecting the electrical cable with both the second cable hanger component and the first cable hanger component. In some embodiments, tensioning the electrical cable may be performed before mechanically connecting the electrical cable with one of the second cable hanger component and/or the first cable hanger component.

In some embodiments, tensioning the electrical cable may be comprised of adjusting, in any suitable manner, a distance between the first mechanical connector and the second mechanical connector in order to exert a desired tensile force on the electrical cable between the first mechanical connector and the second mechanical connector.

In some embodiments, the method may be further comprised of trimming the electrical cable. In some embodiments, the electrical cable may be trimmed after mechanically connecting the electrical cable with the first cable hanger component. In some embodiments, the electrical cable may be trimmed after connecting the electrical cable with the second cable hanger component.

In some embodiments, the first cable hanger component and/or the second cable hanger component may be comprised of an adjusting mechanism for tensioning the electrical cable, and the method may be further comprised of covering the adjusting mechanism with a cover sub after adjusting the distance between the first mechanical connector and the second mechanical connector.

The method may be performed in any sequence which is effective to extend the electrical cable through the tubular member. In some embodiments, the sequence of the method may depend upon the configurations of the first cable hanger component and/or the second cable hanger component, including the mechanical connectors and/or the electrical connectors. In some embodiments, the sequence of the method may depend upon the location and/or the configuration of the tensioning mechanism.

Figure 1:
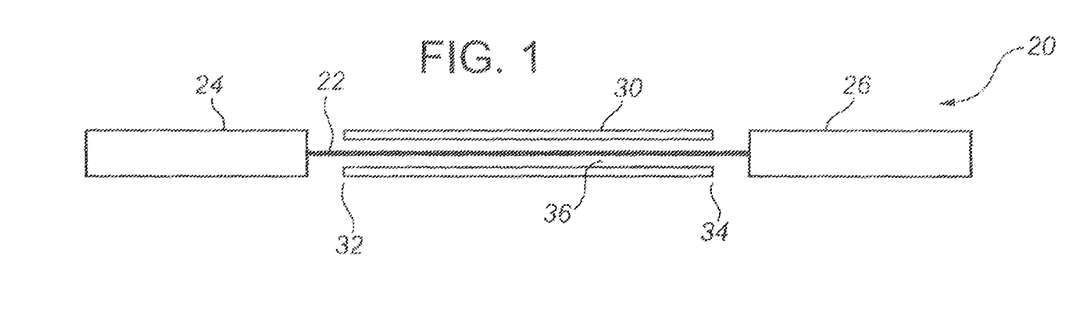
FIG. 1 is a schematic drawing of an exemplary embodiment of a system for extending an electrical cable through a tubular member.
Figure 2:
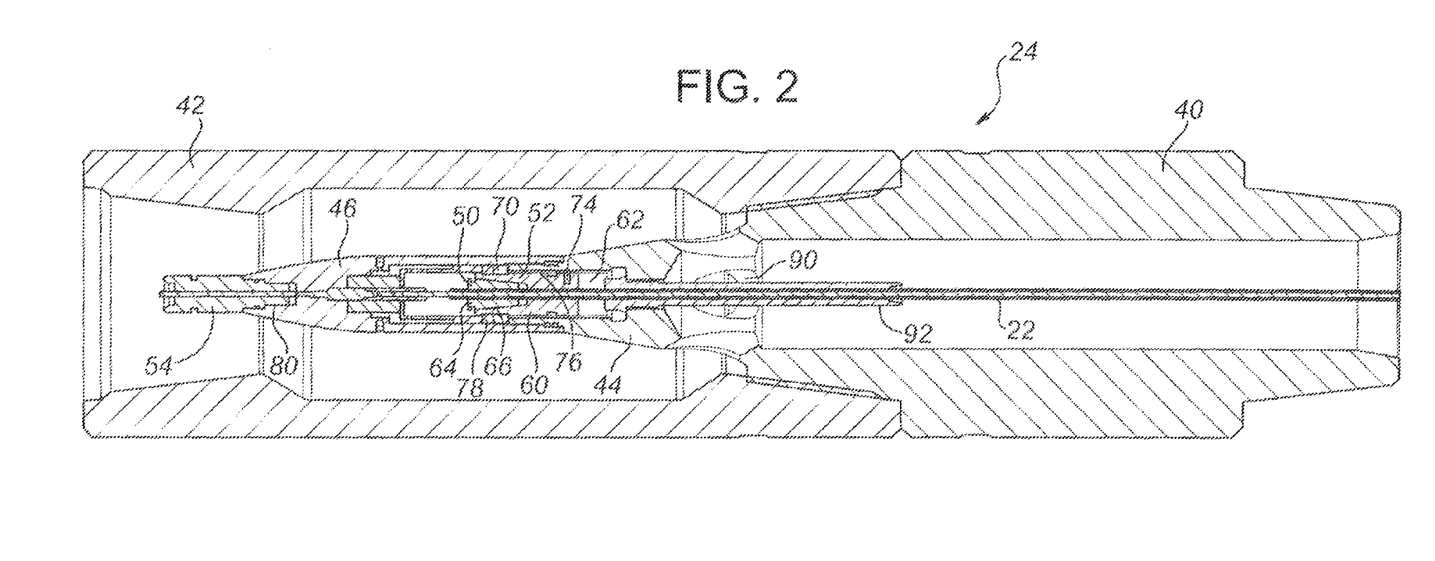
FIG. 2 is a longitudinal section assembly drawing of a first exemplary embodiment of an assembled first cable hanger component in the exemplary system depicted in FIG. 1, in which a stationary connection is provided between the electrical cable and the first cable hanger component.
Figure 3:
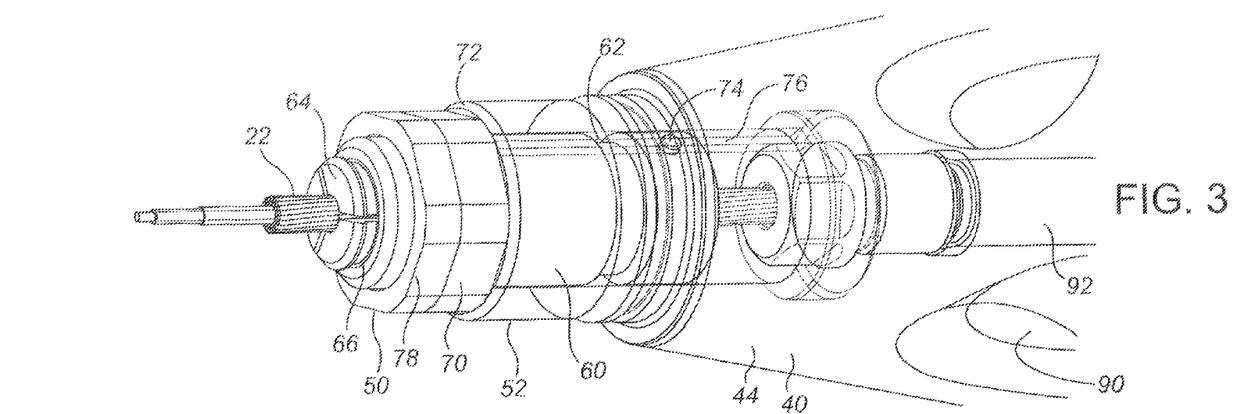
FIG. 3 is a schematic pictorial drawing depicting the operation of the tensioning mechanism in the first exemplary embodiment of the first cable hanger component depicted in FIG. 2.
Figure 4:
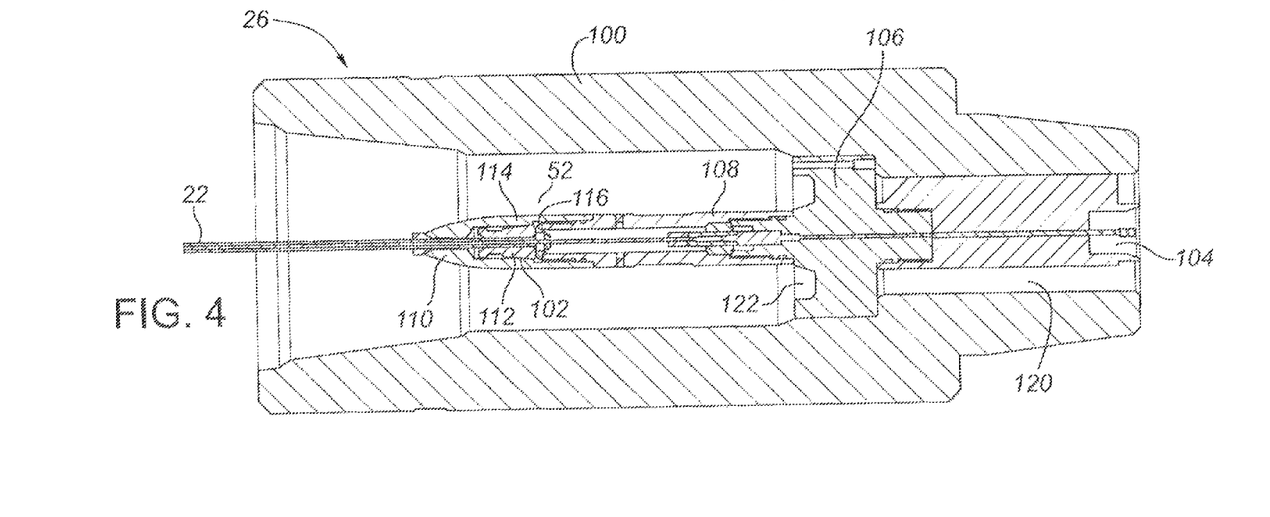
FIG. 4 is a longitudinal section assembly drawing of a first exemplary embodiment of an assembled second cable hanger component in the exemplary system depicted in FIG. 1, in which a stationary connection is provided between the electrical cable and the second cable hanger component.
Figure 5:
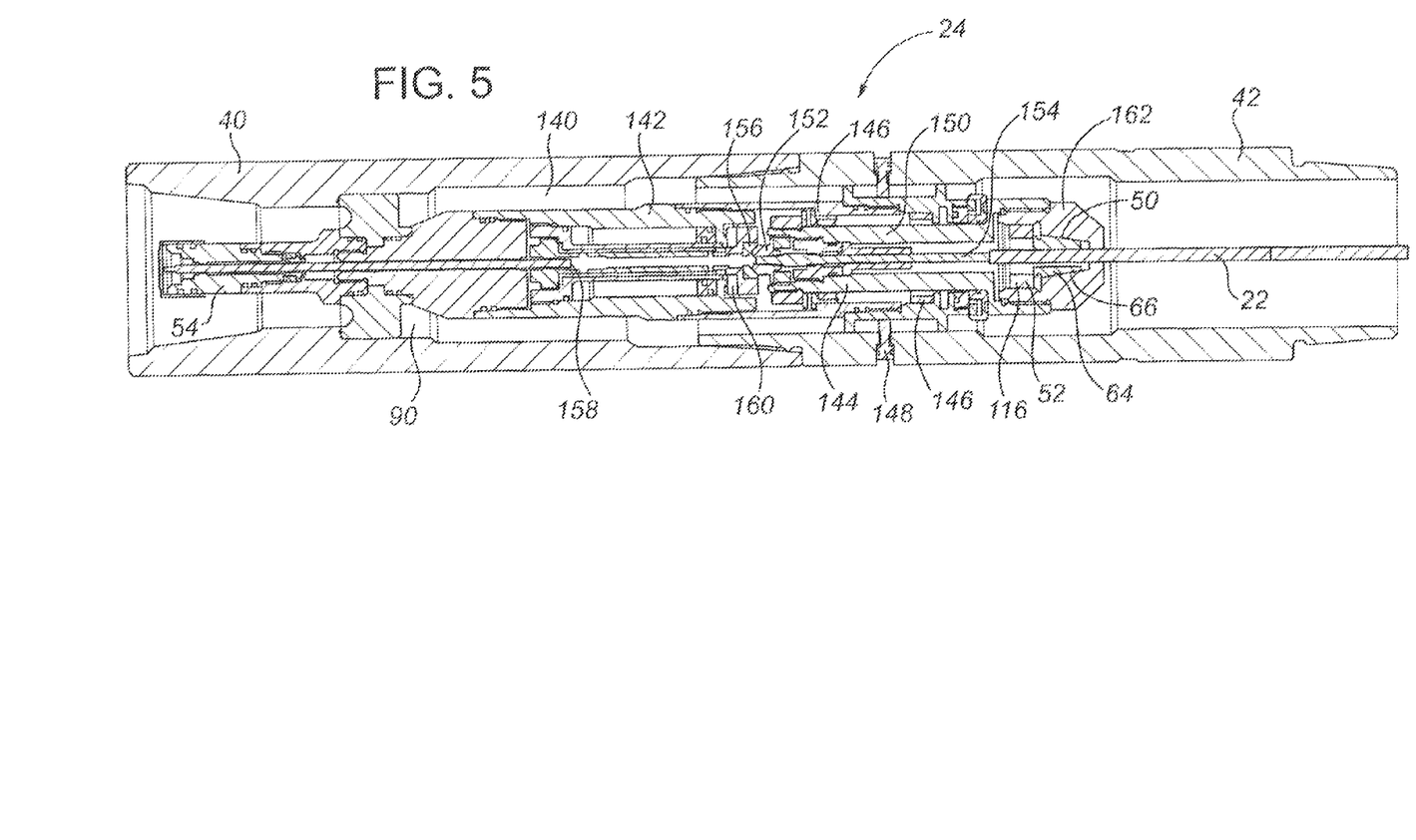
FIG. 5 is a longitudinal section assembly drawing of a second exemplary embodiment of an assembled first cable hanger component in the exemplary system depicted in FIG. 1, in which a rotary connection is provided between the electrical cable and the first cable hanger component.
Figure 6:
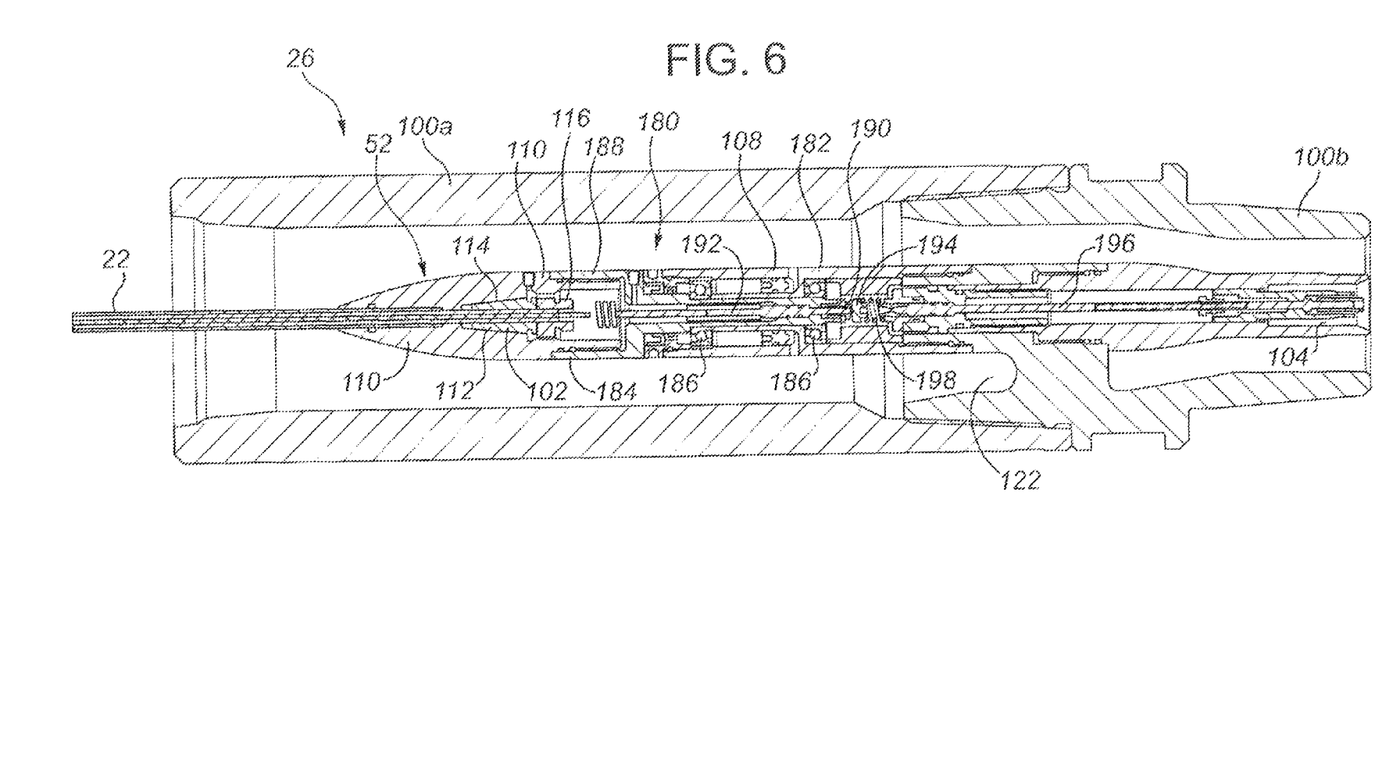
FIG. 6 is a longitudinal section assembly drawing of a second exemplary embodiment of an assembled second cable hanger component in the exemplary system depicted in FIG. 1, in which a rotary connection is provided between the electrical cable and the second cable hanger component.

FIG. 1 is a schematic drawing of an exemplary embodiment of a system for extending an electrical cable through a tubular member. FIG. 2 is a longitudinal section assembly drawing of a first exemplary embodiment of an assembled first cable hanger component in the exemplary system depicted in FIG. 1, in which a stationary connection is provided between the electrical cable and the first cable hanger component. FIG. 3 is a schematic pictorial drawing depicting the operation of the adjusting mechanism in the first exemplary embodiment of the first cable hanger component depicted in FIG. 2. FIG. 4 is a longitudinal section assembly drawing of a first exemplary embodiment of an assembled second cable hanger component in the exemplary system depicted in FIG. 1, in which a stationary connection is provided between the electrical cable and the second cable hanger component. FIG. 5 is a longitudinal section assembly drawing of a second exemplary embodiment of an assembled first cable hanger component in the exemplary system depicted in FIG. 1, in which a rotary connection is provided between the electrical cable and the first cable hanger component. FIG. 6 is a longitudinal section assembly drawing of a second exemplary embodiment of an assembled second cable hanger component in the exemplary system depicted in FIG. 1, in which a rotary connection is provided between the electrical cable and the second cable hanger component.

In the descriptions of the exemplary embodiments which follow, features which provide similar, equivalent or identical structures or functions among the exemplary embodiments may be identified with the same reference numbers.

Referring to FIG. 1, in the exemplary embodiment, the system (20) comprises an electrical cable (22), a first cable hanger component (24), and a second cable hanger component (26). During use of the system (20), the first cable hanger component (24) and the second cable hanger component (26) are assembled, a tubular member (30) is interposed between the first cable hanger component (24) and the second cable hanger component (26), and the electrical cable (22) extends between the cable hanger components (24, 26) so that the electrical cable (22) extends through the tubular member (30).

The tubular member (30) is comprised of a first tubular member end (32), a second tubular member end (34), and a tubular member bore (36).

In the exemplary embodiment of the system (20), the tubular member (30) is comprised of a component of a drill string (not shown). As a component of a drill string, the tubular member (30) may be a drill pipe, a drill collar, a drilling tool, a logging tool, a drilling motor, a rotary steerable drilling apparatus, a stabilizer, a reamer, a steering tool, or any other structure, tool or device which may be included in a drill string.

In one particular application of the exemplary embodiment of the system (20), the tubular member (30) may be comprised of a reamer (not shown) so that the system (20) may convert an unwired reamer to a wired reamer without modifying the reamer, wherein a wired reamer is a reamer which is provided with an electrical cable to facilitate the transfer of electrical energy through the reamer.

In a second particular application of the exemplary embodiment of the system (20), the tubular member (30) may be comprised of a drilling motor (not shown) so that the system (20) may convert an unwired drilling motor to a wired drilling motor without modifying the motor, wherein a wired drilling motor is a drilling motor which is provided with an electrical cable to facilitate the transfer of electrical energy through the drilling motor.

The electrical cable (22) may be comprised of any wire or cable which is capable of transferring the desired electrical energy. In some embodiments of the system (20), the electrical cable (22) may be comprised of a wireline cable, which is particularly suited for use in transferring electrical energy in wells and other downhole environments. In some embodiments of the system (20), the electrical cable (22) may be comprised of one or more electrical conductors contained within a protective jacket. In some embodiments of the system (20), the protective jacket may be electrically conductive.

In the exemplary embodiment of the system (20), both ends of the first cable hanger component (24) are comprised of a threaded connector. In the exemplary embodiment of the system (20), one end of the first cable hanger component (24) is comprised of a box type threaded connector and the other end of the first cable hanger component (24) is comprised of a pin type threaded connector. In the exemplary embodiment of the system (20), the pin type threaded connector on the first cable hanger component (24) is connectable with a box type threaded connector on the first tubular member end (32) so that the first cable hanger component (24) is releasably connectable with the tubular member (30).

In the exemplary embodiment of the system (20), both ends of the second cable hanger component (26) are comprised of a threaded connector. In the exemplary embodiment of the system (20), one end of the second cable hanger component (26) is comprised of a box type threaded connector and the other end of the second cable hanger component is comprised of a pin type threaded connector. In the exemplary embodiment of the system (20), the box type threaded connector on the second cable hanger component (26) is connectable with a pin type threaded connector on the second tubular member end (34) so that the second cable hanger component (26) is releasably connectable with the tubular member (30).

In the description of the two embodiments of the first cable hanger component (24) and the two embodiments of the second cable hanger component (26) which follows, features which are identical or equivalent in the exemplary embodiments will be identified with the same reference numbers.

FIG. 2 depicts a first exemplary embodiment of an assembled first cable hanger component (24), in which a stationary connection is provided between the electrical cable (22) and the first cable hanger component (24). Referring to FIG. 2, in the first exemplary embodiment, the first cable hanger component (24) is comprised of a first cable hanger sub (40) and a first cover sub (42). The first cable hanger sub (40) and the first cover sub (42) are releasably connectable with each other with a threaded connection which is provided by a pin type threaded connector on the first cable hanger sub (40) and a box type threaded connector on the first cover sub (42).

The first cable hanger sub (40) is comprised of a cable connector extension (44) which extends within the first cover sub (42). A cable connector extension housing (46) is threadably connected with the cable connector extension (44). The cable connector extension (44) and the cable connector extension housing (46) are both enclosed by the first cover sub (42).

The electrical cable (22) extends from the tubular member (30), into the first cable hanger sub (40), through the cable connector extension (44), and terminates within the cable connector extension housing (46).

In the first exemplary embodiment of the first cable hanger component (24), a first mechanical connector (50) and a tensioning mechanism (52) are associated with the cable connector extension (44), and a first electrical connector (54) is associated with the cable connector extension housing (46).

Referring to FIGS. 2-3, in the first exemplary embodiment of the first cable hanger component (24), the first mechanical connector (50) is comprised of a swedge housing (60) which is contained within a bore (62) defined by the cable connector extension (44), and a conical collet (64) which fits within a conical bore (66) defined by the swedge housing (60). The electrical cable (22) extends through the conical collet (64) and the conical collet (64) clamps onto the electrical cable (22) in response to axial movement of the conical collet (64) and/or the electrical cable (22) toward the conical bore (66).

Referring to FIGS. 2-3, in the first exemplary embodiment of the first cable hanger component (24), the tensioning mechanism (52) is an adjusting mechanism which is comprised of the cable connector extension (44), the swedge housing (60), and an adjusting nut (70). The swedge housing (60) includes an external thread which engages with the adjusting nut (70) so that the swedge housing (60) extends through the adjusting nut (70). The adjusting nut (70) also engages with a shoulder (72) on the end of the cable connector extension (44). A pin (74) on the exterior of the swedge housing (60) is contained within an axial groove (76) defined in the bore (62) of the cable connector extension (44). In other embodiments, the locations of the pin (74) and the groove (76) may be reversed.

As a result of the configuration of the adjusting mechanism, turning the adjusting nut (70) causes the swedge housing (60) to move axially within the bore (62) without rotating, so that the axial position of the first mechanical connector (50) within the first cable hanger component (24) can be adjusted without twisting the electrical cable (22). In the first exemplary embodiment of the first cable hanger component (24), the adjusting mechanism is further comprised of a lock nut (78) for locking the adjusting nut (70) at a desired position on the swedge housing (60).

Referring to FIG. 2, in the first exemplary embodiment of the first cable hanger component (24), the first electrical connector (54) is mounted within a socket (80) in the end of the cable connector extension housing (46). The electrical cable (22) is connected with the first electrical connector (54) to provide an electrical connection between the electrical cable (22) and the first cable hanger component (24). In the first exemplary embodiment of the first cable hanger component (24), the first electrical connector (54) also provides a connection with another electrical component (not shown) in addition to the electrical cable (22).

In the first exemplary embodiment of the first cable hanger component (24), the cable connector extension (44) defines a plurality of fluid ports (90) for providing fluid communication between the interior of the first cover sub (42) and the interior of the first cable hanger sub (40). In the first exemplary embodiment of the first cable hanger component (24), the electrical cable (22) is enclosed by an erosion protection tube (92) in the vicinity of the fluid ports (90), to protect the electrical cable (22) from potential damage due to fluids passing through the fluid ports (90).

FIG. 4 depicts a first exemplary embodiment of an assembled second cable hanger component (26), in which a stationary connection is provided between the electrical cable (22) and the second cable hanger component (26). In the first exemplary embodiment of the second cable hanger component (26), the second cable hanger component (26) is comprised of a second cable hanger sub (100).

In the first exemplary embodiment of the second cable hanger component (26), the electrical cable (22) extends from the tubular member (30), into the second cable hanger sub (100), and terminates within the second cable hanger sub (100).

In the first exemplary embodiment of the second cable hanger component (26), a second mechanical connector (102) and a second electrical connector (104) are associated with the second cable hanger sub (100).

Referring to FIG. 4, in the first exemplary embodiment of the second cable hanger component (26), the second mechanical connector (102) is comprised of a cable anchor housing (106), a cable connector extension housing (108), a cone housing (110) and a conical collet (112). In the first exemplary embodiment of the second cable hanger component (26), the cable anchor housing (106) is connected within the second cable hanger sub (100) with screws (not shown). In other embodiments, the cable anchor housing (106) may be connected within the second cable hanger sub (100) in any other suitable manner. In the first exemplary embodiment of the second cable hanger component (26), the cable connector extension housing (108) is threadably connected with the cable anchor housing (106) and the cone housing (110) is threadably connected with the cable connector extension housing (108). The conical collet (112) fits within a conical bore (114) defined by the cone housing (110). The electrical cable (22) extends through the conical collet (112) and the conical collet (112) clamps onto the electrical cable (22) in response to axial movement of the conical collet (112) and/or the electrical cable (22) toward the conical bore (114).

In the first exemplary embodiment of the second cable hanger component (26), the tensioning mechanism (52) is comprised of a tensioning nut (116) which is threadably received within the cone housing (110). The tensioning nut (116) may be tightened toward the conical collet (112) in order to axially move the conical collet (112) toward the conical bore (114). The electrical cable (22) may be tensioned by exerting a tensile force on the electrical cable (22) while simultaneously tightening the tensioning nut (116) in order to clamp the tensioned electrical cable within the second mechanical connector (102).

Referring to FIG. 4, in the first exemplary embodiment of the second cable hanger component (26), the second electrical connector (104) is mounted within an end bore (120) of the second cable hanger sub (100). The electrical cable (22) is connected with the second electrical connector (104) to provide an electrical connection between the electrical cable (22) and the second cable hanger component (26). In the first exemplary embodiment of the second cable hanger component (26), the second electrical connector (104) also provides a connection with another electrical component (not shown) in addition to the electrical cable.

In the first exemplary embodiment of the second cable hanger component (26), the cable anchor housing (106) defines a plurality of fluid ports (122) for providing fluid communication through the second cable hanger sub (100).

The description of the second exemplary embodiment of the first cable hanger component (24) and the second cable hanger component (26) which follows is limited to the differences between the second exemplary embodiments and the first exemplary embodiments.

FIG. 5 depicts a second exemplary embodiment of an assembled first cable hanger component (24), in which a rotary connection is provided between the electrical cable (22) and the first cable hanger component (24).

In the second exemplary embodiment of the first cable hanger component (24), the first cable hanger component (24) is comprised of a first cable hanger sub (40) and a first cover sub (42). The first cable hanger sub (40) and the first cover sub (42) are releasably connectable with each other with a threaded connection which is provided by a box type threaded connector on the first cable hanger sub (40) and a pin type threaded connector on the first cover sub (42).

A first rotary connector assembly (140) is threadably connected within the first cable hanger sub (40) and extends within the first cable hanger sub (40) toward the first cover sub (42). A first electrical connector (54) is also connected within the first cable hanger sub (40) and extends within the first cable hanger sub (40) away from the first cover sub (42).

The first rotary connector assembly (140) is comprised of a non-rotating subassembly (142) and a rotating subassembly (144). The non-rotating subassembly (142) is not rotatable relative to the first cable hanger sub (40). The rotating subassembly (144) is rotatable relative to the first cable hanger sub (40). A first rotary bearing assembly (146) rotatably supports the rotating subassembly (144) relative to the non-rotating subassembly (142). Anchor pins (148) extend between the cover sub (42) and the non-rotating subassembly (142) to prevent rotation of the non-rotating subassembly (142) relative to the first cable hanger sub (40).

The rotating subassembly (144) is connected with the electrical cable (22) and is comprised of a first mechanical connector (50), a tensioning mechanism (52), a rotating mandrel (150) and a rotating electrical transfer device (152). A rotating electrical conductor assembly (154) extends between the electrical cable (22) and the rotating electrical transfer device (152).

The non-rotating subassembly (142) is comprised of a non-rotating electrical transfer device (156). A non-rotating electrical conductor assembly (158) extends between the first electrical connector (54) and the non-rotating electrical transfer device (156).

The rotating electrical transfer device (152) and the non-rotating electrical transfer device (154) together enable electrical energy to transfer between the non-rotating subassembly (142) and the rotating subassembly (144). More particularly, the rotating electrical transfer device (152) and the non-rotating electrical transfer device (154) together enable electrical energy to transfer between the electrical cable (22) and the first electrical connector (54).

In the second exemplary embodiment of the first cable hanger component (24), the rotating electrical transfer device (152) is comprised of a cone and the non-rotating electrical transfer device (154) is comprised of a cup. The cup is urged into engagement with the cone by a contact spring (160). The cup and the cone function as a slip ring, and may define one electrical path or a plurality of electrical paths.

In other embodiments, the rotating electrical transfer device (152) and the non-rotating electrical transfer device (154) may be comprised of an alternate slip ring apparatus or some other type of contact type electrical transfer device, or may be comprised of an inductive coupling apparatus or some other type of non-contact type of electrical transfer device.

In the second exemplary embodiment of the first cable hanger component (24), the first mechanical connector (50) is comprised of a conical collet (64) which fits within a conical bore (66) defined by a cone housing (162). The electrical cable (22) extends through the conical collet (64) and the conical collet (64) clamps onto the electrical cable (22) in response to axial movement of the conical collet (64) and/or the electrical cable (22) toward the conical bore (66). The cone housing (162) is threadably connected with the rotating mandrel (150).

In the second exemplary embodiment of the first cable hanger component (24), the tensioning mechanism (52) is comprised of a tensioning nut (116) which is threadably received within the cone housing (162). The tensioning nut (116) may be tightened toward the conical collet (64) in order to axially move the conical collet (64) toward the conical bore (66). The electrical cable (22) may be tensioned by exerting a tensile force on the electrical cable (22) while simultaneously tightening the tensioning nut (116) in order to clamp the tensioned electrical cable within the first mechanical connector (50).

In the second exemplary embodiment of the first cable hanger component (24), the first electrical connector (54) is connected with the electrical cable (22) via the rotating electrical conductor assembly (154), the rotating electrical transfer device (152), the non-rotating electrical transfer device (156), and the non-rotating electrical conductor assembly (158). In the second exemplary embodiment of the first cable hanger component (24), the first electrical connector (54) also provides a connection with another electrical component (not shown) in addition to the electrical cable (22).

In the second exemplary embodiment of the first cable hanger component (24), the first rotary connector assembly (140) defines a plurality of fluid ports (90) for providing fluid communication between the interior of the first cable hanger sub (40) and the first cover sub (42). In the second exemplary embodiment of the first cable hanger component (24), the electrical cable (22) is not exposed to fluids in the vicinity of the fluid ports (90), with the result that the erosion protection tube (92) of the first exemplary embodiment of the first cable hanger component (24) is not required in the second exemplary embodiment.

FIG. 6 depicts a second exemplary embodiment of an assembled second cable hanger component (26), in which a rotary connection is provided between the electrical cable (22) and the second cable hanger component (26).

In the second exemplary embodiment of the second cable hanger component (26), the second cable hanger sub (100) is comprised of two pieces or components (100a, 100b) which are releasable connectable with each other with a threaded connection. In the second exemplary embodiment of the second cable hanger component (26), the cable anchor housing (110) of the first exemplary embodiment is integral with the second cable hanger sub (100b).

In the second exemplary embodiment of the second cable hanger component (26), a second rotary connector assembly (180) is interposed between the cone housing (110) and the second cable hanger sub (100b). The second rotary connector assembly (180) is comprised of a non-rotating subassembly (182) and a rotating subassembly (184). The non-rotating subassembly (182) is not rotatable relative to the second cable hanger sub (100a, 100b). The rotating subassembly (184) is rotatable relative to the second cable hanger sub (100a, 100b). A second rotary bearing assembly (186) rotatably supports the rotating subassembly (184) relative to the non-rotating subassembly (182).

The rotating subassembly (184) is connected with the electrical cable (22) and is comprised of a second mechanical connector (102), a tensioning mechanism (52), a rotating mandrel (188) and a rotating electrical transfer device (190). A rotating electrical conductor assembly (192) extends between the electrical cable (22) and the rotating electrical transfer device (190).

The non-rotating subassembly (182) is comprised of the cable connector extension housing (108) and a non-rotating electrical transfer device (194). A non-rotating electrical conductor assembly (196) extends between the second electrical connector (104) and the non-rotating electrical transfer device (194).

The rotating electrical transfer device (190) and the non-rotating electrical transfer device (194) together enable electrical energy to transfer between the non-rotating subassembly (182) and the rotating subassembly (184). More particularly, the rotating electrical transfer device (190) and the non-rotating electrical transfer device (194) together enable electrical energy to transfer between the electrical cable (22) and the second electrical connector (104).

In the second exemplary embodiment of the second cable hanger component (26), the rotating electrical transfer device (190) is comprised of a cone and the non-rotating electrical transfer device (194) is comprised of a cup. The cup is urged into engagement with the cone by a contact spring (198). The cup and the cone function as a slip ring, and may define one electrical path or a plurality of electrical paths.

In other embodiments, the rotating electrical transfer device (190) and the non-rotating electrical transfer device (194) may be comprised of an alternate slip ring apparatus or some other type of contact type electrical transfer device, or may be comprised of an inductive coupling apparatus or some other type of non-contact type of electrical transfer device.

In the second exemplary embodiment of the second cable hanger component (26), the second mechanical connector (102) is comprised of a conical collet (112) which fits within a conical bore (114) defined by a cone housing (110). The electrical cable (22) extends through the conical collet (112) and the conical collet (112) clamps onto the electrical cable (22) in response to axial movement of the conical collet (112) and/or the electrical cable (22) toward the conical bore (114). The cone housing (110) is threadably connected with the rotating mandrel (188).

In the second exemplary embodiment of the second cable hanger component (26), the tensioning mechanism (52) is comprised of a tensioning nut (116) which is threadably received within the cone housing (110). The tensioning nut (116) may be tightened toward the conical collet (112) in order to axially move the conical collet (112) toward the conical bore (114). The electrical cable (22) may be tensioned by exerting a tensile force on the electrical cable (22) while simultaneously tightening the tensioning nut (116) in order to clamp the tensioned electrical cable within the second mechanical connector (102).

In the second exemplary embodiment of the second cable hanger component (26), the second electrical connector (104) is connected with the electrical cable (22) via the rotating electrical conductor assembly (192), the rotating electrical transfer device (190), the non-rotating electrical transfer device (194), and the non-rotating electrical conductor assembly (196). In the second exemplary embodiment of the second cable hanger component (26), the second electrical connector (104) also provides a connection with another electrical component (not shown) in addition to the electrical cable (22).

In the second exemplary embodiment of the second cable hanger component (26), the second cable hanger sub (100b) defines a plurality of fluid ports (122) for providing fluid communication through the second cable hanger sub (100a, 100b).

In an exemplary embodiment of the system (20), an exemplary method for assembling the system (20) and extending the electrical cable (22) through the tubular member (30) may be comprised of the following:
  (a) mechanically connecting the electrical cable (22) with the second cable hanger component (26) by assembling the second mechanical connector (102), by connecting the electrical cable (22) with the second mechanical connector (102), and by connecting the second mechanical connector (102) within the second cable hanger sub (100);
  (b) electrically connecting the electrical cable (22) with the second cable hanger component (26) by connecting the electrical cable (22) with the second electrical connector (104);

(c) extending the electrical cable (22) through the tubular member (30) so that the electrical cable (22) protrudes from the first tubular member end (32) of the tubular member (30);

(d) connecting the second cable hanger component (26) with the second tubular member end (34) of the tubular member (30) by making up the threaded connection between the second cable hanger sub (100) and the second tubular member end (34);

(e) extending the electrical cable (22) through the first cable hanger component (24) so that the electrical cable (22) protrudes from the cable connector extension (44);

(f) connecting the first cable hanger component (24) with the first tubular member end (32) of the tubular member (30) by making up the threaded connection between the first cable hanger sub (40) and the first tubular member end (32). Depending upon the embodiment of the first cable hanger component (24), if the first cable hanger component (24) comprises a first cable hanger sub (40) and a first cover sub (42), it may be necessary to connect the first cable hanger sub (40) and the first cover sub (42) together before connecting the first cable hanger component (24) with the first tubular member end (32) of the tubular member;

(g) mechanically connecting the electrical cable (22) with the first cable hanger component (24) by connecting the electrical cable (22) with the first mechanical connector (50);

(h) tensioning the electrical cable (22) between the first mechanical connector (50) and the second mechanical connector (102);

(i) electrically connecting the electrical cable (22) with the first cable hanger component (24) by connecting the electrical cable (22) with the first electrical connector (54); and (j) if the first cable hanger component (24) comprises a first cable hanger sub (40) and a first cover sub (42) which have not previously been connected together, connecting the first cover sub (42) with the first cable hanger sub (40).

In the exemplary method, the method may further comprise trimming the electrical cable (22) to a desired length after mechanically connecting the electrical cable (22) with the first cable hanger component (24).

The system and method described herein provides the capability to extend an electrical cable through a tubular member which is not dependent upon the structure and configuration of the tubular member. The system and method described herein may be used to convert any unwired tubular member to a wired tubular member without modification of the tubular member, provided that the tubular member includes a bore extending therethrough which is capable of accommodating the electrical cable.

Furthermore, the system and method described herein provides the capability to provide a stationary to stationary connection, a stationary to rotary connection, a rotary to stationary connection, and/or a rotary to rotary connection through the tubular member by selecting appropriate first and second hanger components.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

We claim:

1. A system for extending an electrical cable through a tubular member, wherein the tubular member has a first tubular member end and a second tubular member end, the system comprising:

(a) the electrical cable;

(b) a first cable hanger component for connecting with the first tubular member end of the tubular member, wherein the first cable hanger component is comprised of a first mechanical connector for mechanically connecting the electrical cable with the first cable hanger component and a first electrical connector for electrically connecting the electrical cable with the first cable hanger component, wherein the first cable hanger component provides either a stationary connection with the electrical cable or a rotary connection with the electrical cable, wherein the first mechanical connector and the first electrical connector do not enable rotation of the electrical cable relative to the first cable hanger component in order to provide the stationary connection, wherein the first mechanical connector and the first electrical connector enable rotation of the electrical cable relative to the first cable hanger component in order to provide the rotary connection, and wherein the rotary connection is provided by a first rotary contact assembly comprising the first mechanical connector and the first electrical connector; and (c) a second cable hanger component for connecting with the second tubular member end of the tubular member, wherein the second cable hanger component is comprised of a second mechanical connector for mechanically connecting the electrical cable with the second cable hanger component and a second electrical connector for electrically connecting the electrical cable with the second cable hanger component, wherein the second cable hanger component provides either a stationary connection with the electrical cable or a rotary connection with the electrical cable, wherein the second mechanical connector and the second electrical connector do not enable rotation of the electrical cable relative to the second cable hanger component in order to provide the stationary connection, wherein the second mechanical connector and the second electrical connector enable rotation of the electrical cable relative to the second cable hanger component in order to provide the rotary connection, and wherein the rotary connection is provided by a second rotary contact assembly comprising the second mechanical connector and the second electrical connector.

2. The system as claimed in claim 1, further comprising a tensioning mechanism for tensioning the electrical cable between the first mechanical connector and the second mechanical connector.

3. The system as claimed in claim 2 wherein the tensioning mechanism is comprised of an adjusting mechanism for adjusting a distance between the first mechanical connector and the second mechanical connector.

4. The system as claimed in claim 3 wherein the first cable hanger component is comprised of the adjusting mechanism, and wherein the adjusting mechanism adjusts an axial position of the first mechanical connector within the first cable hanger component.

5. The system as claimed in claim 4 wherein the first cable hanger component is comprised of a first cable hanger sub and a first cover sub for covering the adjusting mechanism, and wherein the first cover sub is releasably connectable with the first cable hanger sub.

6. The system as claimed in claim 1 wherein the first cable hanger component provides the stationary connection between the electrical cable and the first cable hanger component.

7. The system as claimed in claim 6 wherein the second cable hanger component provides the stationary connection between the electrical cable and the second cable hanger component.

8. The system as claimed in claim 6 wherein the second cable hanger component provides the rotary connection between the electrical cable and the second cable hanger component.

9. The system as claimed in claim 1 wherein the first cable hanger component provides the rotary connection between the electrical cable and the first cable hanger component.

10. The system as claimed in claim 9 wherein the second cable hanger component provides the stationary connection between the electrical cable and the second cable hanger component.

11. The system as claimed in claim 9 wherein the second cable hanger component provides the rotary connection between the electrical cable and the second cable hanger component.

12. A method for extending an electrical cable through a tubular member, wherein the tubular member has a first tubular member end and a second tubular member end, the method comprising:
(a) providing the electrical cable, a first cable hanger component comprising a first mechanical connector for mechanically connecting the electrical cable with the first cable hanger component and a first electrical connector for electrically connecting the electrical cable with the first cable hanger component, wherein the first cable hanger component provides either a stationary connection with the electrical cable or a rotary connection with the electrical cable, wherein the first mechanical connector and the first electrical connector do not enable rotation of the electrical cable relative to the first cable hanger component in order to provide the stationary connection, wherein the first mechanical connector and the first electrical connector enable rotation of the electrical cable relative to the first cable hanger component in order to provide the rotary connection, and wherein the rotary connection is provided by a first rotary contact assembly comprising the first mechanical connector and the first electrical connector, and a second cable hanger component comprising a second mechanical connector for mechanically connecting the electrical cable with the second cable hanger component and a second electrical connector for electrically connecting the electrical cable with the second cable hanger component, wherein the second cable hanger component provides either a stationary connection with the electrical cable or a rotary connection with the electrical cable, wherein the second mechanical connector and the second electrical connector do not enable rotation of the electrical cable relative to the second cable hanger component in order to provide the stationary connection, wherein the second mechanical connector and the second electrical connector enable rotation of the electrical cable relative to the second cable hanger component in order to provide the rotary connection, and wherein the rotary connection is provided by a second rotary contact assembly comprising the second mechanical connector and the second electrical connector;
(b) mechanically connecting the electrical cable with the second cable hanger component using the second mechanical connector;
(c) electrically connecting the electrical cable with the second cable hanger component using the second electrical connector;
(d) extending the electrical cable through the tubular member so that the electrical cable protrudes from the first tubular member end;
(e) connecting the second cable hanger component with the second tubular member end;
(f) extending the electrical cable through the first cable hanger component;
(g) connecting the first cable hanger component with the first tubular member end;
(h) mechanically connecting the electrical cable with the first cable hanger component using the first mechanical connector;
(i) tensioning the electrical cable between the first mechanical connector and the second mechanical connector; and
(j) electrically connecting the electrical cable with the first cable hanger component using the first electrical connector.

13. The method as claimed in claim 12, further comprising trimming the electrical cable after mechanically connecting the electrical cable with the first cable hanger component.

14. The method as claimed in claim 12 wherein mechanically connecting the electrical cable with the second cable hanger component and electrically connecting the electrical cable with the second cable hanger component is comprised of providing the stationary connection between the electrical cable and the second cable hanger component.

15. The method as claimed in claim 14 wherein mechanically connecting the electrical cable with the first cable hanger component and electrically connecting the electrical cable with the first cable hanger component is comprised of providing the stationary connection between the electrical cable and the first cable hanger component.

16. The method as claimed in claim 14 wherein mechanically connecting the electrical cable with the first cable hanger component and electrically connecting the electrical cable with the first cable hanger component is comprised of providing the rotary connection between the electrical cable and the first cable hanger component.

17. The method as claimed in claim 12 wherein mechanically connecting the electrical cable with the second cable hanger component and electrically connecting the electrical cable with the second cable hanger component is comprised of providing the rotary connection between the electrical cable and the second cable hanger component.

18. The method as claimed in claim 17 wherein mechanically connecting the electrical cable with the first cable hanger component and electrically connecting the electrical cable with the first cable hanger component is comprised of providing the stationary connection between the electrical cable and the first cable hanger component.

19. The method as claimed in claim 17 wherein mechanically connecting the electrical cable with the first cable hanger component and electrically connecting the electrical cable with the first cable hanger component is comprised of providing the rotary connection between the electrical cable and the first cable hanger component.

20. The method as claimed in claim 12 wherein tensioning the electrical cable is performed after mechanically connecting the electrical cable with the first cable hanger component.

21. The method as claimed in claim 12 wherein tensioning the electrical cable is performed before mechanically connecting the electrical cable with the first cable hanger component.

\* \* \* \* \*